US012771978B2

(12) United States Patent
Zhang

(10) Patent No.: US 12,771,978 B2
(45) Date of Patent: Oct. 20, 2026

(54) SOUND-PRODUCING UNIT

(71) Applicant: AAC Microtech (Changzhou) Co., Ltd., Changzhou City (CN)

(72) Inventor: Chao Zhang, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 129 days.

(21) Appl. No.: 19/006,311

(22) Filed: Dec. 31, 2024

(65) Prior Publication Data

US 2025/0380074 A1 Dec. 11, 2025

Related U.S. Application Data

(63) Continuation of application No. PCT/CN2024/098004, filed on Jun. 7, 2024.

(51) Int. Cl.

| | |
|---|---|
| ***H04R 1/06*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/06* (2013.01); *H04R 9/025* (2013.01); *H04R 9/045* (2013.01); *H04R 9/046* (2013.01); *H04R 9/06* (2013.01); *H04R 2400/11* (2013.01)

(58) Field of Classification Search

CPC .......... H04R 9/025; H04R 9/043; H04R 7/20; H04R 2499/11; H04R 9/045; H04R 2400/11; H04R 7/04; H04R 1/06

See application file for complete search history.

(56) References Cited

U.S. PATENT DOCUMENTS

2023/0217182 A1* 7/2023 Yonglei .................... H04R 9/06 381/412

* cited by examiner

*Primary Examiner* — Kile O Blair
(74) *Attorney, Agent, or Firm* — Wiersch Law Group

(57) ABSTRACT

The present disclosure provides a sound-producing unit having a flexible printed circuit board that includes a first fixing portion, a first elastic arm extending from the first fixing portion along a first direction, a second elastic arm extending from the first elastic arm along a second direction, and a second fixing portion connected to the second elastic arm. By providing two elastic arms extending in different directions, the first fixing portion and the second fixing portion are positioned on two different planes, which fully utilizes the length of the elastic arms of the flexible printed circuit board. The elastic arms have a three-dimensional structure, which maximizes the elastic support force of the flexible printed circuit board, enhances the vibration sensitivity of the sound-producing unit, and buffers the pressure on the elastic arms, thereby improving the service life of the flexible printed circuit board.

7 Claims, 2 Drawing Sheets

SOUND-PRODUCING UNIT

TECHNICAL FIELD

The present application relates to the field of electroacoustic devices, and more particularly, to a sound-producing unit.

BACKGROUND

With the development of electronic technology, portable consumer electronic devices, such as mobile phones, handheld game consoles, navigation devices, and handheld multimedia entertainment devices, have become increasingly popular. These devices often use voice feedback for system responses, such as call alerts on mobile phones or navigation prompts, which rely on sound-producing units.

In related art, a sound-producing unit includes a frame, a vibration system fixed to the frame, and a magnetic circuit system. The vibration system comprises a diaphragm, a voice coil configured to drive the diaphragm to vibrate and produce sound, and a flexible printed circuit board electrically connected to the voice coil. The conductive path of the voice coil is led to a pad of the sound-producing unit via the flexible printed circuit board. Typically, the flexible printed circuit board is planar and is supported by an extension from the dome of the diaphragm to connect the flexible printed circuit board to the leading wire of the voice coil.

However, the extension from the dome occupies space in the magnetic circuit system and results in wasted length of the elastic arm of the flexible printed circuit board, which is detrimental to the vibration of the flexible printed circuit board and the sensitivity of the sound-producing unit. Therefore, there is a need for a new technical solution to address the above issues.

SUMMARY

An object of the present application is to provide a sound-producing unit with high utilization of the elastic arm length of the flexible printed circuit board.

To achieve the above purpose, the present invention provides a sound-producing unit, comprising a frame; a vibration system fixed to the frame, comprising a diaphragm, a voice coil configured to drive the diaphragm to vibrate and produce sound, and a flexible printed circuit board electrically connected to the voice coil; and a magnetic circuit system fixed to the frame, comprising a first fixing portion, a first elastic arm extending from the first fixing portion along a first direction, a second elastic arm extending from the first elastic arm along a second direction not parallel to the first direction, and a second fixing portion connected to the second elastic arm. The first elastic arm comprises a first bending portion connected to one end of the first fixing portion and bent toward the other end of the first fixing portion, and a second bending portion extending from the first bending portion and bent toward the one end of the first fixing portion, the first bending portion being spaced apart from the first fixing portion and the second bending portion, and the first bending portion being connected to the first fixing portion and the second bending portion via arc-shaped transitions.

The second elastic arm comprises a first arc portion connected to the second bending portion, a middle portion extending from the first arc portion along the second direction, and a second arc portion extending from the middle portion away from the first fixing portion and connected to the second fixing portion.

The frame comprises a top wall, a bottom wall opposite to the top wall, and a side wall connecting the top wall and the bottom wall, the side wall forming an accommodation cavity. The voice coil is disposed in the accommodation cavity, the first fixing portion is fixed to the top wall, the diaphragm is fixed to the bottom wall, the second fixing portion is fixed to the diaphragm, and the first fixing portion and the second fixing portion are arranged in parallel.

The voice coil is fixed to the diaphragm and spaced apart from the second fixing portion, and a leading wire of the voice coil is connected to the second fixing portion.

In addition, the second direction is a vibration direction of the diaphragm, and the first direction is perpendicular to the vibration direction.

In addition, each of the first fixing portion and the second fixing portion includes a pad, the pad on the first fixing portion is welded to an external circuit, and the leading wire is welded to the pad on the second fixing portion to connect the voice coil to the external circuit.

In addition, the voice coil has a rectangular structure with rounded corners, and the sound-producing unit comprises four flexible printed circuit boards; two non-adjacent flexible printed circuit boards are symmetrically distributed around the center of the voice coil along a circumferential direction of the voice coil.

In addition, the frame has a rectangular structure corresponding to the voice coil, the four flexible printed circuit boards are respectively fixed to the four corners of the frame, the first elastic arm has a shape consistent with the rounded corners of the voice coil, and the four first elastic arms are arranged corresponding to the four rounded corners of the voice coil.

In addition, the magnetic circuit system comprises a lower plate, a main magnet and an auxiliary magnet fixed to the lower plate, the auxiliary magnet surrounding the main magnet for forming a magnetic gap for at least partially receiving the voice coil, and a main pole plate attached to the main magnet and an auxiliary pole plate attached to the auxiliary magnet, the auxiliary pole plate being spaced apart from the flexible printed circuit board and comprising an avoidance portion for avoiding the flexible printed circuit board.

In addition, the first fixing portion, the first elastic arm, the second elastic arm, and the second fixing portion are integrally formed.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

Figure 1:
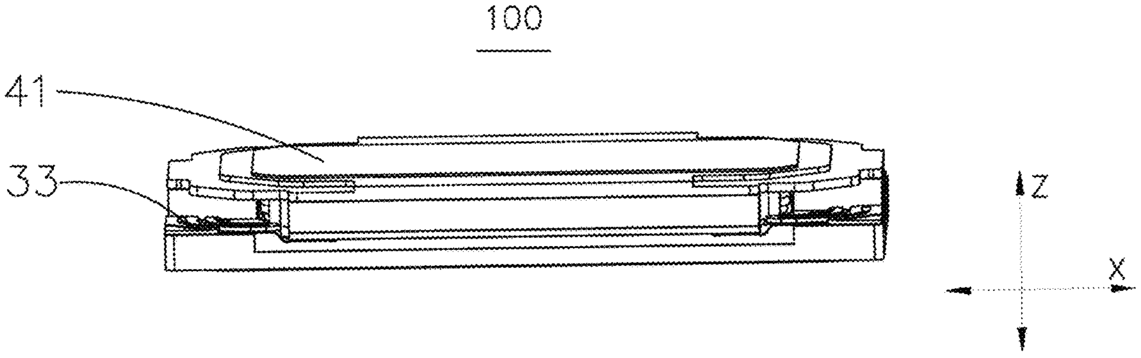
FIG. 1 is an isometric view of a sound-producing unit provided by one embodiment of the present disclosure.

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Referring to FIGS. 1-4, the sound-producing unit 100 provided by the present application comprises a frame 20, a vibration system 30 fixed to the frame 20, and a magnetic circuit system 40. The vibration system 30 comprises a diaphragm 31, a voice coil 32 configured to drive the diaphragm 31 to vibrate and produce sound, and a flexible printed circuit board 33 electrically connected to the voice coil 32.

Figure 3:
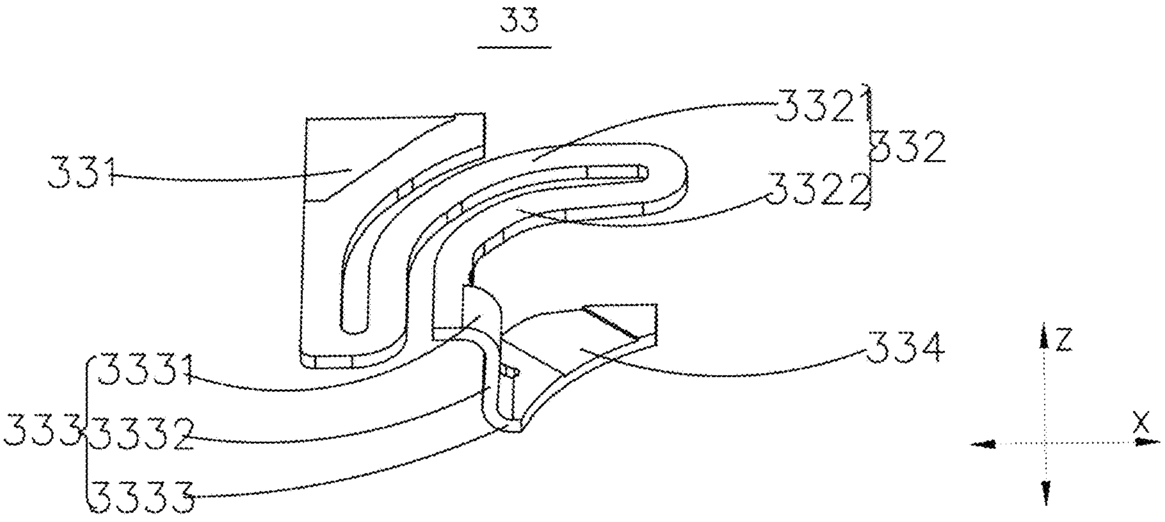
FIG. 3 is an isometric view of a flexible printed circuit board in the sound-producing unit.
Figure 4:
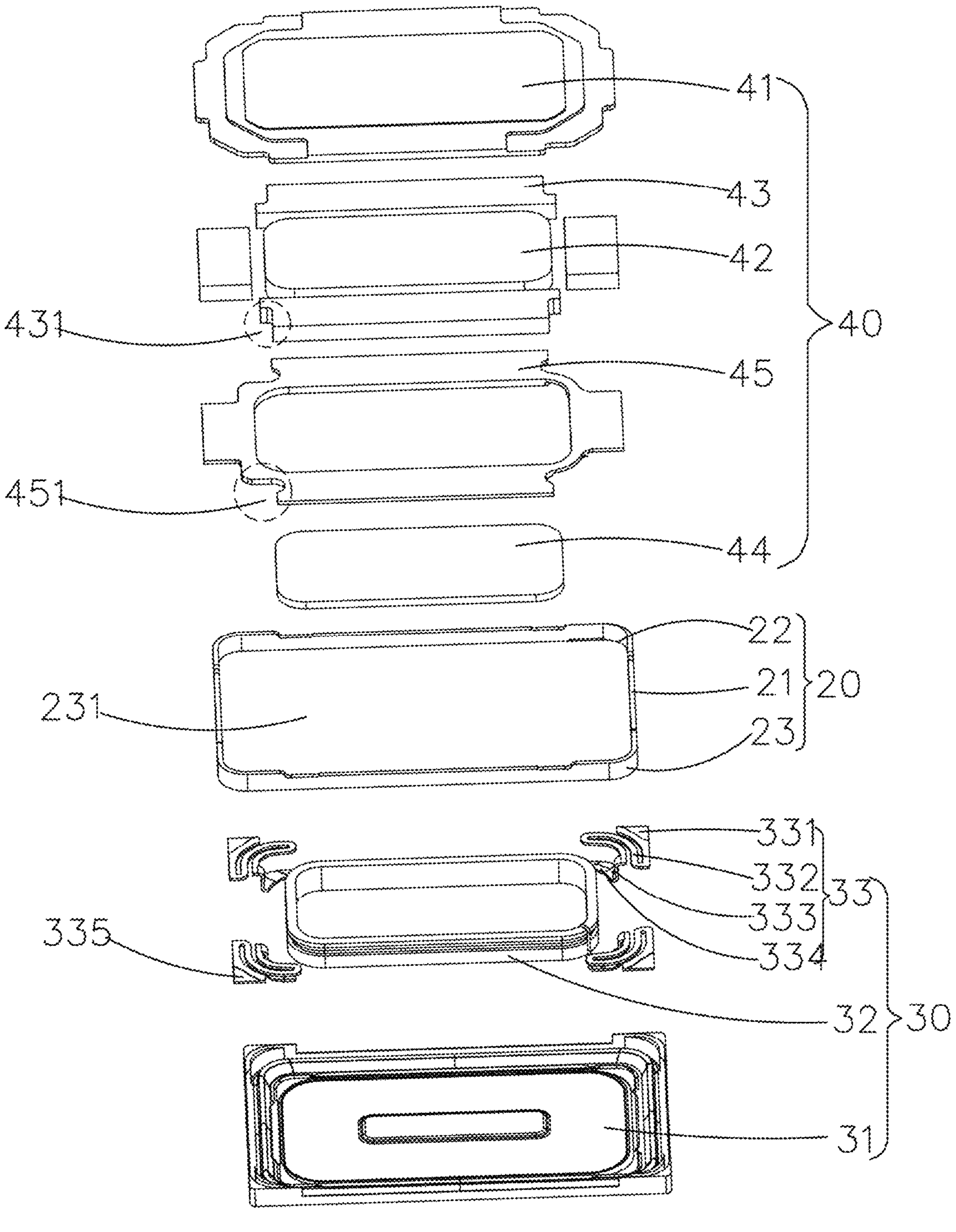
FIG. 4 is an exploded view of the sound-producing unit.

To fully utilize the length of the elastic arms of the flexible printed circuit board 33, referring to FIGS. 3 and 4, the flexible printed circuit board 33 comprises a first fixing portion 331, a first elastic arm 332 extending from the first fixing portion 331 along a first direction X, a second elastic arm 333 extending from the first elastic arm 332 along a second direction Z, and a second fixing portion 334 connected to the second elastic arm 333, wherein the first direction X and the second direction Z are non-parallel. With this structure, the first fixing portion 331 and the second fixing portion 334 of the flexible printed circuit board 33 are positioned on different planes. The first elastic arm 332 and the second elastic arm 333 connect the first fixing portion 331 and the second fixing portion 334, respectively, giving the elastic arms a three-dimensional structure. This maximizes the elastic support force of the flexible printed circuit board 33, enhances the vibration sensitivity of the sound-producing unit 100, and buffers the pressure on the elastic arms, thereby improving the service life of the flexible printed circuit board 33.

Preferably, in the present application, the second direction Z is the vibration direction of the diaphragm 31, and the first direction X is a horizontal direction perpendicular to the vibration direction. This allows for better design of the placement of the flexible printed circuit board 33, providing better support for vibration.

Specifically, referring to FIG. 3, the first elastic arm 332 comprises a first bending portion 3321 connected to one end of the first fixing portion 331 and bent toward the other end of the first fixing portion 331, and a second bending portion 3322 extending from the first bending portion 3321 and bent toward the one end of the first fixing portion 331. The first bending portion 3321 is spaced apart from the first fixing portion 331 and the second bending portion 3322, and the first bending portion 3321 is connected to the first fixing portion 331 and the second bending portion 3322 via arc-shaped transitions. The second elastic arm 333 comprises a first arc portion 3331 connected to the second bending portion 3322, a middle portion 3332 extending from the first arc portion 3331 along the second direction Z, and a second arc portion 3333 extending from the middle portion 3332 away from the first fixing portion 331 and connected to the second fixing portion 334. The connection between the first elastic arm 332 and the second elastic arm 333 is arc-shaped, which further buffers the elastic deformation of the elastic arms, prevents the elastic arms from breaking, and ensures the service life of the flexible printed circuit board 33.

Figure 2:
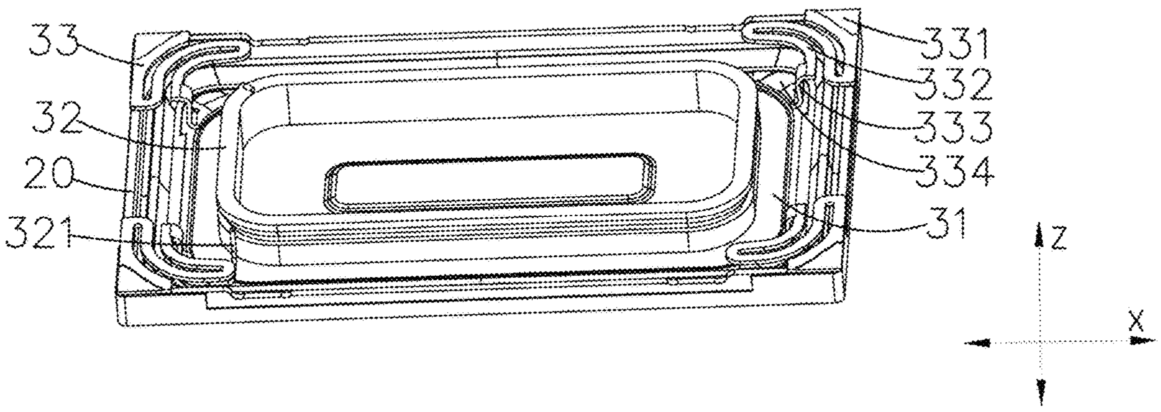
FIG. 2 is an isometric view of the sound-producing unit with a magnetic circuit system thereof removed.

Further, referring to FIGS. 2 and 4, the frame 20 of the present application comprises a top wall 21, a bottom wall 22 opposite to the top wall 21, and a side wall 23 connecting the top wall 21 and the bottom wall 22. The side wall 23 forms an accommodation cavity 231, and the voice coil 32 is disposed in the accommodation cavity 231. The first fixing portion 331 of the flexible printed circuit board 33 is fixed to the top wall 21 of the frame 20, and the second fixing portion 334 of the flexible printed circuit board 33 is fixed to the diaphragm 31.

The diaphragm 31 is fixed to the bottom wall 22 of the frame 20, and the first fixing portion 331 and the second fixing portion 334 are arranged in parallel. The diaphragm 31 and the flexible printed circuit board 33 are only fixedly connected through the second fixing portion 334, allowing the first elastic arm 332 and the second elastic arm 333 of the flexible printed circuit board 33 to freely support. In this way, the first fixing portion 331 and the second fixing portion 334 of the flexible printed circuit board 33 are positioned on two planes at different heights, and the two elastic arms connect the first fixing portion 331 and the second fixing portion 334. Compared to the planar flexible printed circuit board in the prior art, the three-dimensional flexible printed circuit board 33 provided by the present application has better elastic support effects. It should be noted that the top wall 21 and the bottom wall 22 of the frame 20 are described relative to the placement position in the drawings of the present application and do not represent the actual placement direction in practical applications.

Further, the voice coil 32 is also fixed to the diaphragm 31 and spaced apart from the second fixing portion 334. That is, the flexible printed circuit board 33 is not directly fixed to the voice coil 32 but is electrically connected to the voice coil 32 through the leading wire 321 of the voice coil 32 via the second fixing portion 334.

To ensure more stable electrical connections for the flexible printed circuit board 33, referring to FIG. 4, the first fixing portion 331 and the second fixing portion 334 of the flexible printed circuit board 33 are each provided with a pad 335. The pad 335 on the first fixing portion 331 is welded to an external circuit, and the leading wire 321 of the voice coil 32 is welded to the pad 335 on the second fixing portion 334 to connect the voice coil 32 to the external circuit. When the voice coil 32 is energized, it drives the diaphragm 31 to vibrate and produce sound. The arrangement of the pads 335 ensures more stable electrical connections, preventing the leading wire 321 of the voice coil 32 from disconnecting during vibration. As described in actual needs, other methods, such as conductive adhesive, may be used as alternatives to the pads 335.

Further, referring to FIGS. 2 and 4, the voice coil 32 has a rectangular structure with rounded corners. The sound-producing unit comprises four flexible printed circuit boards 33, and along the circumferential direction of the voice coil 32, two non-adjacent flexible printed circuit boards 33 are symmetrically distributed around the center of the voice coil 32. The symmetrically arranged flexible printed circuit boards 33 ensure the structural stability of the sound-producing unit 100. The frame 20 has a rectangular structure corresponding to the voice coil 32, and the four flexible printed circuit boards 33 are respectively fixed to the four corners of the frame 20. The shape of the first elastic arm 332 is consistent with the rounded corners of the voice coil 32, and the four first elastic arms 332 are arranged corresponding to the four rounded corners of the voice coil 32. The flexible printed circuit boards 33 are fixed at the corners of the frame 20, and the first elastic arms 332 have a rounded shape, which maximizes the utilization of the vibration space without occupying the space of the magnetic circuit system 40, ensuring the performance of the sound-producing unit 100.

Further, referring to FIG. 4, the magnetic circuit system 40 comprises a lower plate 41, a main magnet 42 fixed to the lower plate 41, and an auxiliary magnet 43 fixed to the lower plate 41. The auxiliary magnet 43 surrounds the main magnet 42 to form a magnetic gap, and the voice coil 32 is disposed in the magnetic gap. The magnetic circuit system 40 further comprises a main pole plate 44 attached to the main magnet 42 and an auxiliary pole plate 45 attached to the auxiliary magnet 43. The auxiliary pole plate 45 is spaced apart from the flexible printed circuit board 33 and comprises an avoidance portion 451 configured to avoid the flexible printed circuit board 33. The outer periphery of the auxiliary magnet 43 is also provided with a notch portion 431 to avoid the flexible printed circuit board 33, and the notch portion 431 corresponds to the avoidance portion 451, thereby preventing the flexible printed circuit board 33 from colliding with the magnetic circuit system 40 during vibration.

Preferably, the first fixing portion 331, the first elastic arm 332, the second elastic arm 333, and the second fixing portion 334 are integrally formed.

Compared with the related art, the flexible printed circuit board 33 of the present application comprises the first fixing portion 331, the first elastic arm 332 extending from the first fixing portion 331 along the first direction X, the second elastic arm 333 extending from the first elastic arm 332 along the second direction Z, and the second fixing portion 334 connected to the second elastic arm 333, wherein the first direction X and the second direction Z are non-parallel.

By providing two elastic arms extending in different directions, the first fixing portion 331 and the second fixing portion 334 are positioned on two different planes. This configuration fully utilizes the length of the elastic arms of the flexible printed circuit board 33. Additionally, the elastic arms have a three-dimensional structure, which maximizes the elastic support force of the flexible printed circuit board 33. This enhances the vibration sensitivity of the sound-producing unit 100, buffers the pressure on the elastic arms, and improves the service life of the flexible printed circuit board 33.

The foregoing is merely illustrative of embodiments of the present invention, and it should be noted that modifications may be made to those skilled in the art without departing from the spirit of the invention but are intended to be within the scope of the inventio.

What is claimed is:

1. A sound-producing unit, comprising:

a frame;

a vibration system fixed to the frame, comprising a diaphragm, a voice coil configured to drive the diaphragm to vibrate and produce sound, and a flexible printed circuit board electrically connected to the voice coil; and a magnetic circuit system fixed to the frame, comprising a first fixing portion, a first elastic arm extending from the first fixing portion along a first direction, a second elastic arm extending from the first elastic arm along a second direction not parallel to the first direction, and a second fixing portion connected to the second elastic arm;

wherein the first elastic arm comprises a first bending portion connected to one end of the first fixing portion and bent toward the other end of the first fixing portion, and a second bending portion extending from the first bending portion and bent toward the one end of the first fixing portion, the first bending portion being spaced apart from the first fixing portion and the second bending portion, and the first bending portion being connected to the first fixing portion and the second bending portion via arc-shaped transitions;

the second elastic arm comprises a first arc portion connected to the second bending portion, a middle portion extending from the first arc portion along the second direction, and a second arc portion extending from the middle portion away from the first fixing portion and connected to the second fixing portion;

the frame comprises a top wall, a bottom wall opposite to the top wall, and a side wall connecting the top wall and the bottom wall, the side wall forming an accommodation cavity;

the voice coil is disposed in the accommodation cavity, the first fixing portion is fixed to the top wall, the diaphragm is fixed to the bottom wall, the second fixing portion is fixed to the diaphragm, and the first fixing portion and the second fixing portion are arranged in parallel; and the voice coil is fixed to the diaphragm and spaced apart from the second fixing portion, and a leading wire of the voice coil is connected to the second fixing portion.

2. The sound-producing unit as described in claim 1, wherein the second direction is a vibration direction of the diaphragm, and the first direction is perpendicular to the vibration direction.

3. The sound-producing unit as described in claim 1, wherein each of the first fixing portion and the second fixing portion includes a pad, the pad on the first fixing portion is welded to an external circuit, and the leading wire is welded to the pad on the second fixing portion to connect the voice coil to the external circuit.

4. The sound-producing unit as described in claim 1, wherein the voice coil has a rectangular structure with rounded corners, and the sound-producing unit comprises four flexible printed circuit boards; two non-adjacent flexible printed circuit boards are symmetrically distributed around the center of the voice coil along a circumferential direction of the voice coil.

5. The sound-producing unit as described in claim 4, wherein the frame has a rectangular structure corresponding to the voice coil, the four flexible printed circuit boards are respectively fixed to the four corners of the frame, the first elastic arm has a shape consistent with the rounded corners of the voice coil, and the four first elastic arms are arranged corresponding to the four rounded corners of the voice coil.

6. The sound-producing unit as described in claim 1, wherein the magnetic circuit system comprises:

a lower plate;

a main magnet and an auxiliary magnet fixed to the lower plate, the auxiliary magnet surrounding the main magnet for forming a magnetic gap for at least partially receiving the voice coil; and a main pole plate attached to the main magnet and an auxiliary pole plate attached to the auxiliary magnet, the auxiliary pole plate being spaced apart from the flexible printed circuit board and comprising an avoidance portion for avoiding the flexible printed circuit board.

7. The sound-producing unit as described in claim 1, wherein the first fixing portion, the first elastic arm, the second elastic arm, and the second fixing portion are integrally formed.

* * * * *